(12) United States Patent
Shionoya et al.

(10) Patent No.: US 12,531,276 B2
(45) Date of Patent: Jan. 20, 2026

(54) ELECTRODE AND SECONDARY BATTERY

(71) Applicant: TOYOTA JIDOSHA KABUSHIKI KAISHA, Toyota (JP)

(72) Inventors: Haruka Shionoya, Toyota (JP); Yusuke Kintsu, Miyoshi (JP); Tetsuya Mimura, Chiryu (JP); Takeshi Kondo, Kariya (JP); Yuta Kawamoto, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 513 days.

(21) Appl. No.: 17/981,950

(22) Filed: Nov. 7, 2022

(65) Prior Publication Data
US 2023/0216090 A1 Jul. 6, 2023

(30) Foreign Application Priority Data

Jan. 5, 2022 (JP) ................. 2022-000423

(51) Int. Cl.
*H01M 10/0585* (2010.01)
*H01M 4/13* (2010.01)

(52) U.S. Cl.
CPC ......... *H01M 10/0585* (2013.01); *H01M 4/13* (2013.01)

(58) Field of Classification Search
None
See application file for complete search history.

(56) References Cited

U.S. PATENT DOCUMENTS

| 6,444,357 B1 | 9/2002 | Kambe et al. |
| 2013/0202959 A1 | 8/2013 | Chiang et al. |
| 2016/0126541 A1 | 5/2016 | Goto et al. |
| 2020/0185680 A1 | 6/2020 | Kim et al. |

FOREIGN PATENT DOCUMENTS

| EP | 4 152 432 A1 | 3/2023 |
| JP | 2001-035484 A | 2/2001 |
| JP | 2002-015764 A | 1/2002 |
| JP | 2011-253820 A | 12/2011 |
| JP | 2012-104274 A | 5/2012 |
| JP | 2013134894 A | * 7/2013 |
| JP | 2021-009846 A | 1/2021 |

OTHER PUBLICATIONS

English Translation of Sugimoto JP2013134894.*
Haruka Shionoya et al., U.S. Appl. No. 17/943,689, filed Sep. 13, 2022.

* cited by examiner

*Primary Examiner* — Niki Bakhtiari
(74) *Attorney, Agent, or Firm* — Sughrue Mion, PLLC

(57) ABSTRACT

An electrode includes a base material and an active material layer. The active material layer is disposed on a base material surface. One or more grooves are formed on an active material layer surface. The one or more grooves linearly extend along the surface of the active material layer. In a plan view, each of the one or more grooves includes an inlet region, an intermediate region, and an outlet region. Each of the inlet region and the outlet regions is configured such that a first pressure loss occurring when a fluid flows in a forward direction is smaller than a second pressure loss occurring when the fluid flows in a backward direction.

7 Claims, 7 Drawing Sheets

FIG. 4
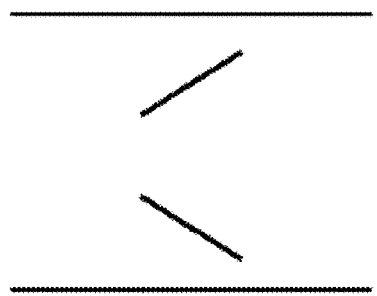
FIG. 5
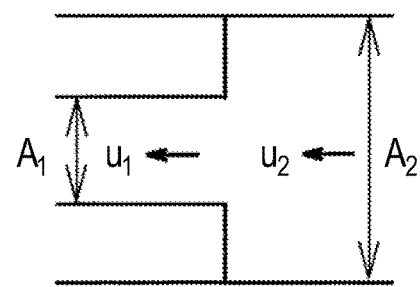
FD ⟵⟶ BD
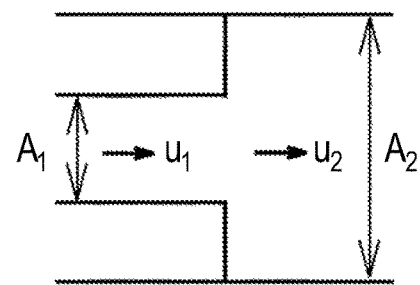

ELECTRODE AND SECONDARY BATTERY

CROSS-REFERENCE TO RELATED APPLICATION

This application claims priority to Japanese Patent Application No. 2022-000423 filed on Jan. 5, 2022, incorporated herein by reference in its entirety.

BACKGROUND

1. Technical Field

The present disclosure relates to an electrode and a secondary battery.

2. Description of Related Art

Japanese Unexamined Patent Application Publication No. 2021-009846 (JP 2021-009846 A) discloses a technique of embodying adhesive force in the form of pattern on the surface of a separation membrane to enhance the impregnation ability of an electrolytic solution and the gas discharge ability.

SUMMARY

Hereinafter, a secondary battery can be simply described as "battery". Generally, the battery includes an electrode and an electrolytic solution. The electrode includes an active material layer. The active material layer is porous. The active material layer is permeated with the electrolytic solution.

In a case where the active material layer is not fully permeated with the electrolytic solution, for example, a problem such as deterioration of cycle characteristics is assumed to occur. Therefore, for example, forming groove (linear recesses) on the surface of the active material layer is considered. The groove can be flow channels for the electrolytic solution. The formation of groove is expected to facilitate the permeation of the electrolytic solution.

For example, sometimes a gas is generated by the decomposition of the electrolytic solution. The gas generated in the groove can form air bubbles. The air bubbles are likely to stay in the groove for a long period of time. There can be a lack of the electrolytic solution around the air bubbles. Local deterioration is likely to progress around the air bubbles.

The present disclosure is to facilitate the discharge of air bubbles in an electrode having one or more grooves.

Hereinafter, the technical configuration and operation and effect of the present disclosure will be described. Here, the mechanism of action of the present specification includes an assumption. The mechanism of action does not limit the technical scope of the present disclosure.

An aspect of the present disclosure relates to an electrode. The electrode includes a base material and an active material layer. The active material layer is disposed on a surface of the base material. There are one or more grooves on a surface of the active material layer. The one or more grooves linearly extend along the surface of the active material layer. In a plan view, each of the one or more grooves includes an inlet region, an intermediate region, and an outlet region. The inlet region includes an inlet opening portion at a periphery of the active material layer. The outlet region includes an outlet opening portion at the periphery of the active material layer. The intermediate region is disposed between the inlet region and the outlet region. The intermediate region connects the inlet region with the outlet region. Each of the inlet region and the outlet region is configured such that a first pressure loss occurring when a fluid flows in a forward direction is smaller than a second pressure loss occurring when the fluid flows in a backward direction. The forward direction represents a direction from the inlet region to the outlet region. The backward direction represents a direction from the outlet region to the inlet region.

In a case where the first pressure loss occurring when a fluid flows in the forward direction is smaller than the second pressure loss caused when the fluid flows in the backward direction in each of the inlet region and the outlet region of each groove, each of the inlet region and the outlet region can function as "backflow prevention valve". It is expected that, accordingly, the fluid (electrolytic solution) in the groove will easily flow in one direction which is the forward direction. In other words, it is expected that the flow of the electrolytic solution will have directivity. Because the electrolytic solution flows in one direction in the groove, the air bubbles can move in one direction with the flow of the electrolytic solution. As a result, it is expected that air bubbles will be easily discharged from the groove.

In the above aspect, at least one of the inlet region and the outlet region may be configured such that streams of a fluid converge when the fluid flows in the forward direction and diverge when the fluid flows in the backward direction.

The inlet region and the outlet region can include any backflow prevention mechanism. The convergence of streams of the fluid can facilitate the flow. In contrast, the divergence of streams of the fluid can cause, for example, a vortex. The occurrence of a vortex can increase the pressure loss.

In the above aspect, at least one of the inlet region and the outlet region may include a portion where the cross-sectional area decreases in the forward direction.

Hereinafter, the portion where the cross-sectional area decreases in the forward direction will be also described as "cross-sectional area changing portion". The cross-sectional area changing portion can be a backflow prevention mechanism. The cross-sectional area changing portion can function as a contraction pipe for the flow in the forward direction. In the contraction pipe, the flow in the forward direction can be facilitated. The cross-sectional area changing portion can function as an expansion pipe for the flow in the backward direction. In the expansion pipe, the flow in the backward direction can be hindered.

In the above aspect, at least one of the inlet region and the outlet region may include a Tesla valve-shaped planar pattern.

"Tesla valve" is a flow channel pattern developed by Nikola Tesla. In the Tesla valve, due to the action of the flow channel shape, the second pressure loss in the backward direction can be significantly larger than the first pressure loss in the forward direction. The Tesla valve has no moving part. The Tesla valve is suited for a backflow prevention mechanism.

In the above aspect, in the cross section orthogonal to the direction along which each of the one or more grooves extends, the inlet opening portion has a first cross-sectional area, and the intermediate region has a second cross-sectional area. The first cross-sectional area may be smaller than the second cross-sectional area.

The active material layer can expand and contract with charge and discharge. The cross-sectional area of each groove can also change due to the volume change of the active material layer. Therefore, the pressure loss of each groove also changes with charge and discharge. According to the new findings of the present disclosure, the pressure loss can change much in a portion having a relatively small cross-sectional area. Hereinafter, "portion having a relatively small cross-sectional area" will be also described as "narrowing portion". Providing the narrowing portion in the inlet opening portion is expected to facilitate the inflow of an electrolytic solution into the groove from the inlet opening portion and hinder the discharge of the electrolytic solution outside the groove from the inlet opening portion. As a result, it is expected that the flow of the electrolytic solution in the groove will be facilitated, which will further facilitate the discharge of air bubbles.

The secondary battery may include an electrode and an electrolytic solution.

The secondary battery can have excellent cycle characteristics. Presumably, this is because air bubbles are readily discharged from the groove.

Hereinafter, an embodiment of the present disclosure (hereinbelow, can also be simply described as "the present embodiment") will be described. Here, the present embodiment does not limit the technical scope of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a conceptual view showing a second example of a cross-sectional area changing portion;

FIG. 5 is a conceptual view showing a third example of the cross-sectional area changing portion;

DETAILED DESCRIPTION OF EMBODIMENTS

Figure 1:
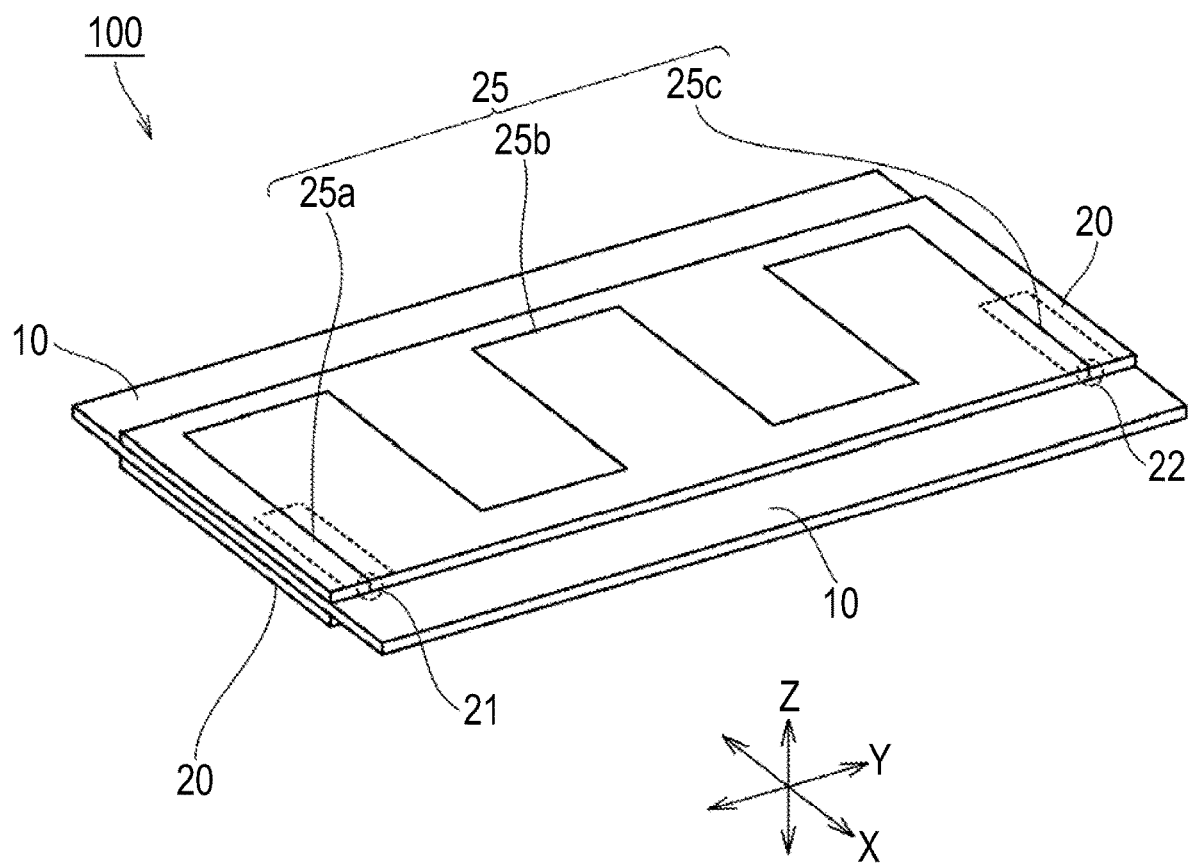
FIG. 1 is a schematic view showing an electrode in the present embodiment.

In the present specification, "including", "containing", "having", and descriptions which are modifications (for example, "composed of" or the like) of these are an open-ended form. The open-ended form may or may not include additional elements in addition to essential elements. The description "consisting of" is a closed form. However, even in the closed form, additional elements that are usually accompanying impurities or irrelevant to the technique of the present disclosure art not excluded. The description of "substantially consists of" is a semi-closed form. In the semi-closed form, the addition of elements that substantially do not affect the basic and novel characteristics of the technique of the present disclosure is acceptable.

In the present specification, the expressions such as "may" and "can" do not mean "must" which signifies requisiteness, and are used to mean "be likely to" which signifies acceptability.

In the present specification, unless otherwise specified, a numerical range such as "m % to n %" includes an upper limit and a lower limit. That is, "m % to n %" represents a numerical range of "m % or more and n % or less". "m % or more and n % or less" includes "more than m % and less than n %". A numerical value arbitrarily selected from a numerical range may be adopted as a new upper or lower limit. For example, a new numerical range may be set by arbitrarily combining a numerical value within a numerical range with a numerical value described in another part, table, or drawing in the present specification.

In the present specification, all numerical values are modified by the term "about". The term "about" can mean, for example, 5%, 3%, +1%, and the like. All numerical values can be approximate values that can change depending on the mode of use of the technique of the present disclosure. All numerical values can be expressed in significant figures. A measured value can be an average of values obtained by measurement performed multiple times. The number of times of measurement may be 3 or more, 5 or more, or 10 or more. Generally, it is expected that the reliability of the average will be improved as the number of times of measurement increases. The measured value can be rounded off to the nearest integer based on number of digits of the significant figures. The measured value can include, for example, an error that occurs due to the detection limit of the measuring device or the like.

Geometric terms (for example, "parallel", "perpendicular", and "orthogonal") in the present specification should not be interpreted in a strict sense. For example, "parallel" may be slightly different from "parallel" in a strict sense. Geometric terms in the present specification can include, for example, a design, work, or manufacturing tolerance or error. The dimensional relationships in each drawing sometimes do not agree with the actual dimensional relationships. In order to help the understanding of the technique of the present disclosure, sometimes the dimensional relationships (such as length, width, and thickness) in each drawing are changed. Furthermore, some configurations may not be shown in each drawing in some cases.

"Plan view" in the present specification means that an object (for example, an active material layer or an electrode) is seen in a direction parallel to the thickness direction of the object. For example, seeing an active material layer 20 in the Z-axis direction of FIGS. 1 and 6 can correspond to the plan view.

In the present specification, in a case where a compound is represented by a stoichiometric composition formula (for example, "$LiCoO_2$"), the stoichiometric composition formula is merely a typical example of the compound. The compound may have a non-stoichiometric composition. For example, in a case where lithium cobalt oxide is represented by "$LiCoO_2$", unless otherwise specified, the lithium cobalt oxide is not limited to the composition ratio of "Li/Co/O=1/1/2", and can contain Li, Co, and O at any composition ratio. Doping or substitution with trace elements and the like are also acceptable.

"D50" in the present specification defined as a particle size at which a cumulative frequency of particles having a particle size smaller than D50 reaches 50% in a volume-based particle size distribution. D50 can be measured by a laser diffraction-type particle size distribution analyzer.

"Electrode" in the present specification is a generic term for a positive electrode and a negative electrode. The electrode may be a positive or negative electrode.

"Secondary battery" in the present specification represents a battery that can be charged and discharged. The secondary battery can be based on any battery system as long as the secondary battery contains an electrolytic solution. The secondary battery may be, for example, a lithium ion battery. The present embodiment is an example of application to a lithium ion battery. Here, the technique of the present disclosure is also applicable to battery systems other than the lithium ion battery.

Electrode

FIG. 1 is a schematic view showing an electrode in the present embodiment. Hereinafter, "electrode in the present embodiment" can be simply described as "the present electrode". The present electrode 100 is for a secondary battery. The secondary battery will be described later. The present electrode 100 is in the form of a sheet. The present electrode 100 includes a base material 10 and an active material layer 20.

Base Material

The base material 10 is a support for the active material layer 20. The base material 10 may be, for example, in the form of a sheet or mesh. The base material 10 may have, for example, a beltlike planar shape. The base material 10 may have conductivity. The base material 10 may function as a current collector. A part of the base material 10 may be exposed from the active material layer 20. For example, a current collector member may be joined to the exposed portion of the base material 10.

The base material 10 can have any thickness. The thickness of the base material 10 may be, for example, 5 µm to 50 µm or 5 µm to 20 µm.

The base material 10 may include, for example, a metal foil. The base material 10 may contain, for example, at least one metal selected from the group consisting of aluminum (Al), copper (Cu), nickel (Ni), titanium (Ti), chromium (Cr), and iron (Fe). The base material 10 may include, for example, at least one foil selected from the group consisting of an Al foil, an Al alloy foil, a Cu foil, a Cu alloy foil, a Ni foil, a Ni alloy foil, a Ti foil, and a stainless steel foil. In a case where the present electrode 100 is a positive electrode, the base material 10 may include, for example, an Al foil. In a case where the present electrode 100 is a negative electrode, the base material 10 may include, for example, a Cu foil.

Active Material Layer

The active material layer 20 is disposed on a surface of the base material 10. The active material layer 20 may be disposed on only one surface of the base material 10, or may be disposed on both the front and back surfaces of the base material 10. The active material layer 20 can have any thickness. The thickness of the active material layer 20 may be, for example, 5 µm to 1,000 µm, 10 µm to 500 µm, or 50 µm to 250 µm.

Groove

One or more grooves 25 (recesses) are formed on a surface of the active material layer 20. The groove 25 linearly extends along the surface of the active material layer 20. The groove 25 can be formed by any method. For example, the groove 25 may be formed by pressing a projection pattern on the surface of the active material layer 20. For example, the groove 25 may be formed using an embossing roll.

One groove 25 or a plurality of grooves 25 may be formed. The pitch between the adjacent grooves 25 (the distance between parallel lines) may be, for example, 0.1 mm to 10 mm.

In a plan view (XY plane of FIG. 1), the groove 25 includes an inlet region 25a, an intermediate region 25b, and an outlet region 25c. The inlet region 25a includes an inlet opening portion 21 at the periphery of the active material layer 20. The outlet region 25c includes an outlet opening portion 22 at the periphery of the active material layer 20. The intermediate region 25b is disposed between the inlet region 25a and the outlet region 25c. The intermediate region 25b connects the inlet region 25a and the outlet region 25c.

The length of the intermediate region 25b may be, for example, 50% to 98% of the total length of the groove 25. The length of the inlet region 25a may be, for example, 1% to 25% of the total length of the groove 25. The length of the outlet region 25c may be, for example, 1% to 25% of the total length of the groove 25. The total length of the groove 25 may be, for example, 1 mm to 5,000 mm or 1 mm to 1,000 mm.

Figure 2:
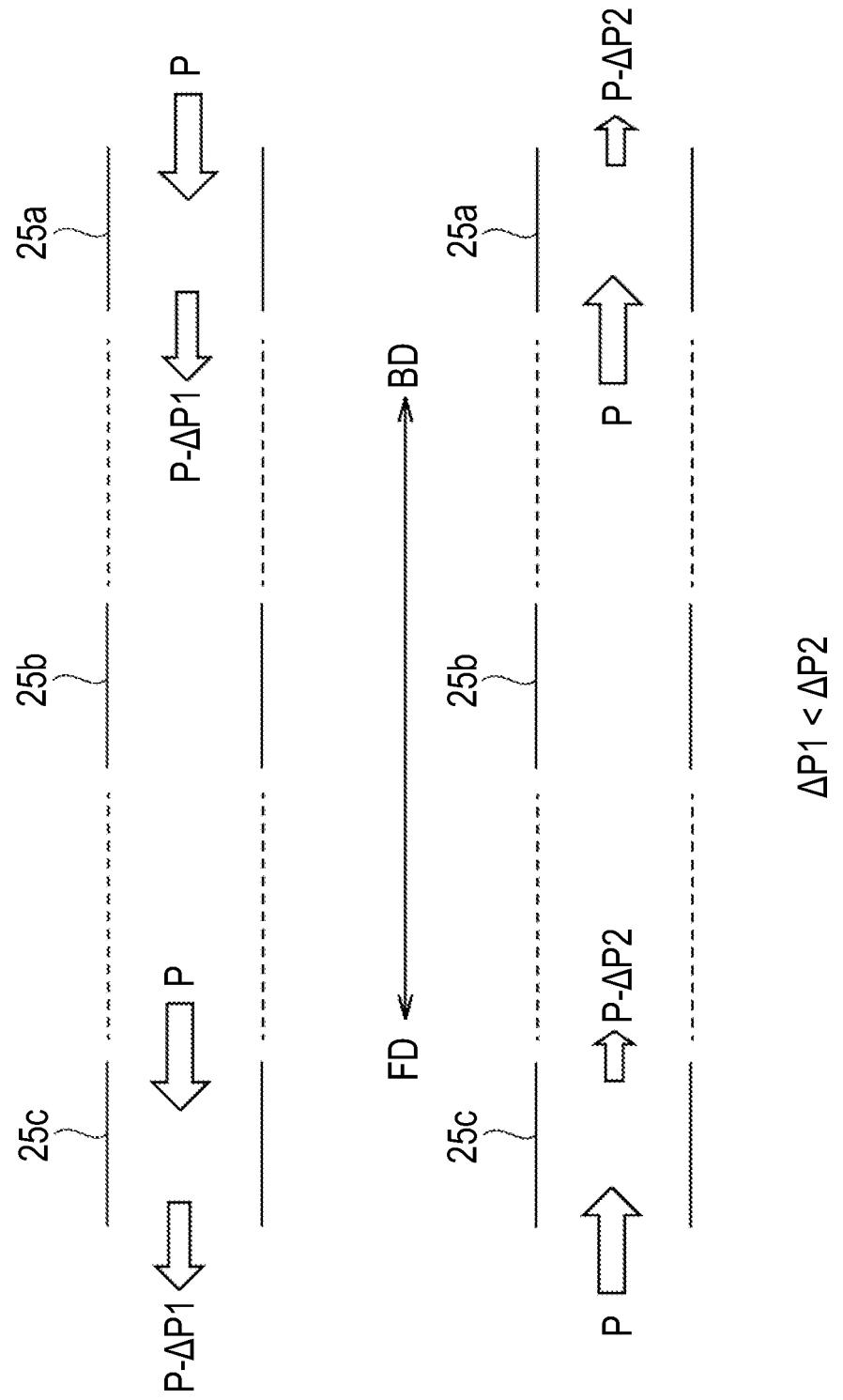
FIG. 2 is a conceptual view showing the flow of a fluid.

FIG. 2 is a conceptual view showing the flow of a fluid. The groove 25 has a forward direction FD and a backward direction BD. The forward direction FD represents a direction from the inlet region 25a to the outlet region 25c. The backward direction BD represents a direction from the outlet region 25c to the inlet region 25a.

A first pressure loss $\Delta P1$ represents a pressure loss that occurs when the fluid flows in the forward direction FD. When the fluid flows in the forward direction FD, the first pressure loss $\Delta P1$ can occur in the inlet region 25a. Likewise, the first pressure loss $\Delta P1$ can also occur in the outlet region 25c. The pressure loss in the outlet region 25c may be the same as or different from the pressure loss in the inlet region 25a.

A second pressure loss $\Delta P2$ represents a pressure loss that occurs when the fluid flows in the backward direction BD. When the fluid flows in the backward direction BD, the second pressure loss $\Delta P2$ can occur in the outlet region 25c. Likewise, the second pressure loss $\Delta P2$ can also occur in the inlet region 25a.

Each of the inlet region 25a and the outlet region 25c is configured to satisfy the relationship of "$\Delta P1 \leq \Delta P2$". As a result, the electrolytic solution is expected to flow in one direction (forward direction FD). It is expected that the flow of the electrolytic solution in one direction will make it difficult for air bubbles to stay in the groove 25. For example, the relationship of "$1<(\Delta P2/\Delta P1)\leq 100$", "$2\leq(\Delta P2/\Delta P1)$", or "$10\leq(\Delta P2/\Delta P1)$" may be satisfied. The extent of pressure loss can be determined by, for example, the Darcy-Weisbach equation.

Backflow Prevention Mechanism

Each of the inlet region 25a and the outlet region 25c includes a backflow prevention mechanism. The backflow prevention mechanism can realize the relationship of "$\Delta P1<\Delta P2$". The inlet region 25a and the outlet region 25c may include any backflow prevention mechanism. For example, at least one of the inlet region 25a and the outlet region 25c may include a first backflow prevention mechanism. For example, at least one of the inlet region 25a and the outlet region 25c may include a second backflow prevention mechanism. For example, at least one of the inlet region 25a and the outlet region 25c may include a combination of the first backflow prevention mechanism and the second backflow prevention mechanism.

Figure 3:
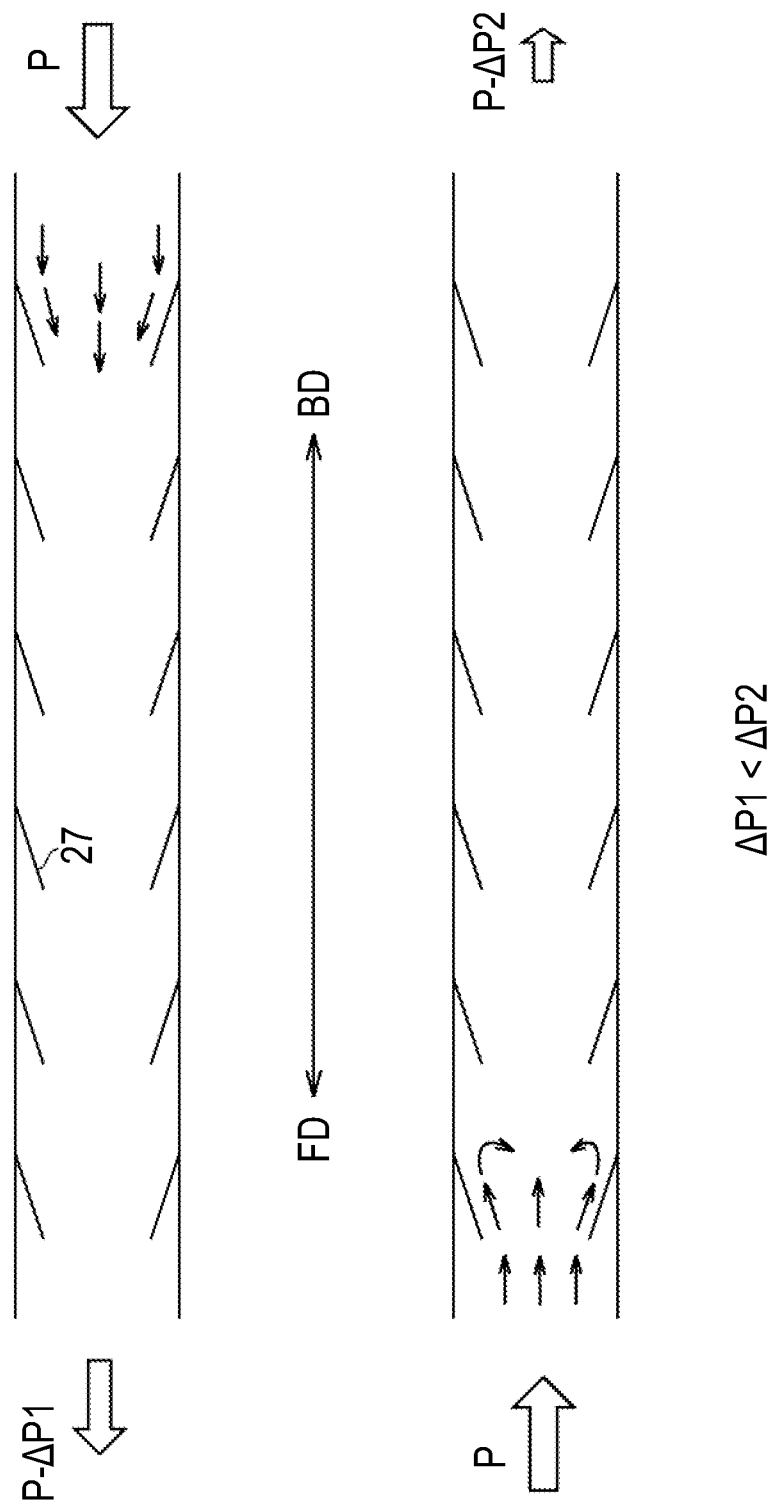
FIG. 3 is a conceptual view showing a first backflow prevention mechanism.

FIG. 3 is a conceptual view showing the first backflow prevention mechanism. In the first backflow prevention mechanism, a cross-sectional area changing portion 27 is provided in the groove. FIG. 3 shows a first example of the cross-sectional area changing portion 27. The cross-sectional area changing portion 27 is connected to the side wall of the groove. In the cross-sectional area changing portion 27, the cross-sectional area decreases in the forward direction FD. The cross-sectional area may continuously change. The cross-sectional area may gradually decrease. One cross-sectional area changing portion 27 or a plurality of cross-sectional area changing portions 27 may be provided. The cross-sectional areas changing portions 27 may be arranged in a row in the forward direction FD.

When a fluid flows in the forward direction FD, the cross-sectional area changing portion 27 can function as a contraction pipe. That is, in the cross-sectional area changing portion 27, the streams can converge. As a result, the flow in the forward direction FD can be facilitated.

When the fluid flows in the backward direction BD, the cross-sectional area changing portion 27 can function as an expansion pipe. That is, in the cross-sectional area changing portion 27, the streams may diverge. The divergent streams can form a vortex. The generation of a vortex can increase a pressure loss. That is, the flow of in the backward direction BD can be hindered.

FIG. 4 is a conceptual view showing a second example of the cross-sectional area changing portion. The cross-sectional area changing portion may be, for example, separated from the side wall of the groove. That is, there may be a gap between the cross-sectional area changing portion and the side wall of the groove.

FIG. 5 is a conceptual view showing a third example of the cross-sectional area changing portion. For example, in the cross-sectional area changing portion, the cross-sectional area may change stepwise.

When the cross-sectional area changes stepwise, the cross-sectional area changing portion can function as a sudden contraction pipe for the flow in the forward direction FD. The pressure loss in the sudden contraction pipe can be determined by the following equations (1) to (3).

$$\zeta = \xi(1/C_e - 1)^2 \quad (1)$$

$$h = \zeta(u_2^2/2g) \quad (2)$$

$$\Delta P = \rho g h \quad (3)$$

$\zeta$: loss coefficient, $\xi \approx 1$, $C_e$: contraction coefficient, h: loss head [m]
$u_2$: flow velocity [m/s](see FIG. 5), g: acceleration of gravity [m/s$^2$]
$\rho$: fluid density [kg/m$^3$], $\Delta P$: pressure loss When the cross-sectional area changes stepwise, the cross-sectional area changing portion can function as a sudden expansion pipe for the flow in the backward direction BD. The pressure loss in the sudden expansion pipe can be determined by the following equations (4) to (6).

$$\zeta = \xi(1 - A_1/A_2)^2 \quad (4)$$

$$h = \zeta(u_1^2/2g) \quad (5)$$

$$\Delta P = \rho g h \quad (6)$$

$\zeta$: loss coefficient, $\xi \approx 1$, $A_1$, $A_2$: cross-sectional area (see FIG. 5), h: loss head [m]
$u_1$: flow velocity [m/s](see FIG. 5), g: acceleration of gravity [m/s$^2$]
$\rho$: fluid density [kg/m$^3$], $\Delta P$: pressure loss The contraction coefficient ($C_e$) and the loss coefficient (Q) are values obtained from the experimental results of Weissbach. The relationship among the contraction coefficient ($C_e$), the loss coefficient (C), and the cross-sectional area ratio ($A_1/A_2$) is shown in the following Table 1.

TABLE 1

| $A_1/A_2$ | 0.1 | 0.2 | 0.3 | 0.4 | 0.5 | 0.6 | 0.7 | 0.8 | 0.9 | 1.0 |
|---|---|---|---|---|---|---|---|---|---|---|
| Cc | 0.61 | 0.62 | 0.63 | 0.65 | 0.67 | 0.70 | 0.73 | 0.77 | 0.84 | 1.00 |
| $\zeta$ | 0.41 | 0.38 | 0.34 | 0.29 | 0.24 | 0.18 | 0.14 | 0.089 | 0.036 | 0.0 |

Figure 6:
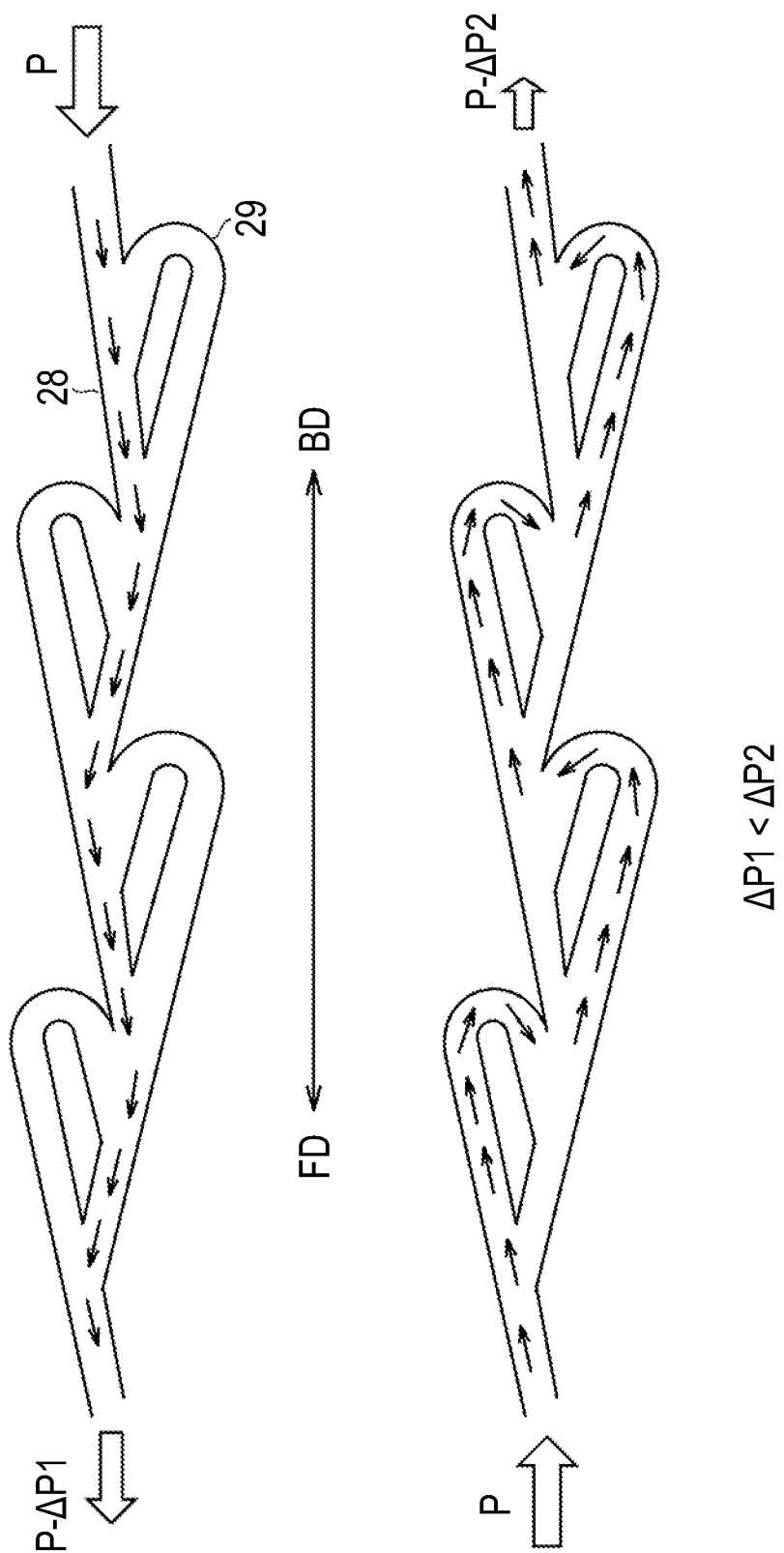
FIG. 6 is a conceptual view showing a second backflow prevention mechanism.

FIG. 6 is a conceptual view showing the second backflow prevention mechanism. In the second backflow prevention mechanism, the groove includes a Tesla valve-shaped planar pattern. The Tesla valve includes a teardrop-shaped loop flow channel 29. The Tesla valve may include one loop flow channel 29 or a plurality of loop flow channels 29. The loop flow channels 29 may be arranged in a row in the forward direction FD.

When flowing in the forward direction FD, a fluid is unlikely to flow into the loop flow channel 29. The fluid flows through a main flow channel 28. It is considered that accordingly, when the fluid flows in the forward direction FD, a pressure loss may be small. On the other hand, when flowing in the backward direction BD, a fluid can flow into the loop flow channel 29. It is considered that the pressure loss may increase due to the bending of the flow.

Narrowing Portion

For example, the inlet opening portion 21 may be provided with a narrowing portion. The cross-sectional area of the groove 25 in the narrowing portion is smaller than the cross-sectional area of the groove 25 in other portions. In a case where the inlet opening portion 21 includes the narrowing portion, the inflow of an electrolytic solution from the inlet opening portion 21 can be facilitated. In a case where the inlet opening portion 21 includes the narrowing portion, the outflow of an electrolytic solution from the inlet opening portion 21 can be hindered. As a result, the discharge of air bubbles can be further facilitated.

Figure 7:
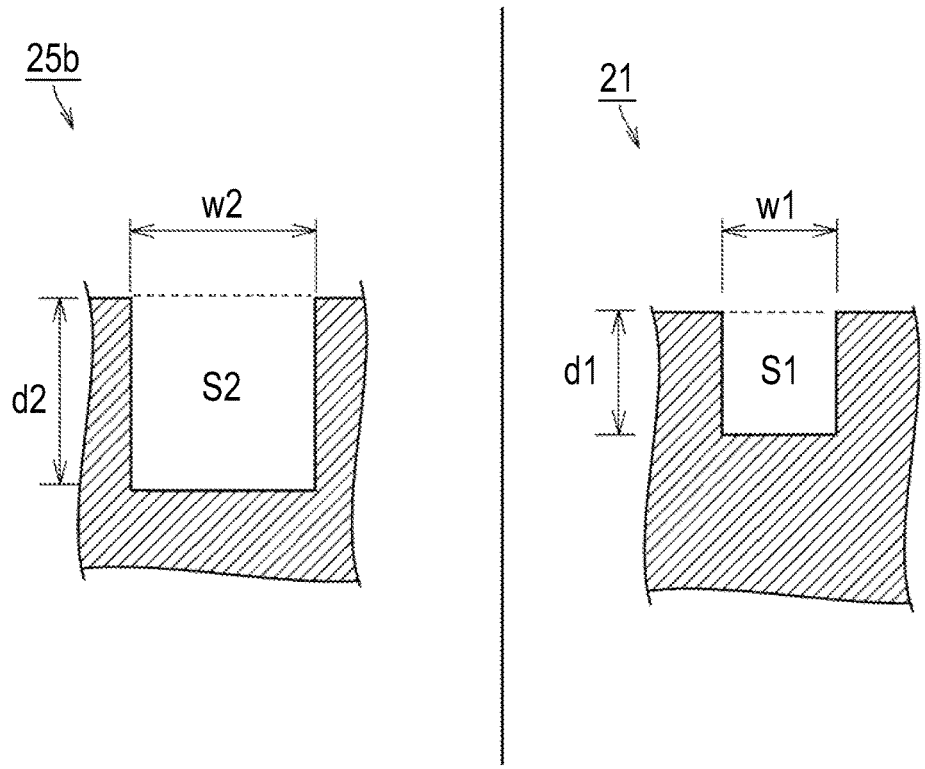
FIG. 7 is schematic cross-sectional views of an inlet opening portion and an intermediate region.

FIG. 7 is schematic cross-sectional views of the inlet opening portion and the intermediate region. The cross sections in FIG. 7 are orthogonal to the direction along which the groove 25 extends (the axial direction of the groove). The inlet opening portion 21 has, for example, a first cross-sectional area S1. The intermediate region 25b has a second cross-sectional area S2. For example, the relationship of "S1<S2" may be satisfied. For example, the relationship of "$0.1 \leq (S1/S2) \leq 0.9$" or "$0.3 \leq (S1/S2) \leq 0.7$" may be satisfied.

The inlet opening portion 21 has a first depth d1. The intermediate region 25b has a second depth d2. The depth" represents the maximum depth in the cross section orthogonal to the axial direction of the groove. Each of the first depth d1 and the second depth d2 may be, for example, 10 μm to 400 μm or 50 μm to 200 μm. For example, the relationship of "$0.1 \leq (d1/d2) \leq 0.9$" or "$0.3 \leq (d1/d2) \leq 0.7$" may be satisfied.

The ratio of the second depth d2 to the thickness of the active material layer 20 may be, for example, 0.1 to 0.9 or 0.3 to 0.7.

The inlet opening portion 21 has a first width w1. The intermediate region 25b has a second width w2. The width represents the maximum width in the cross section orthogonal to the axial direction of the groove. Each of the first width w1 and the second width w2 may be, for example, 10 μm to 500 μm or 50 μm to 250 μm. For example, the relationship of "$0.1 \leq (w1/w2) \leq 0.9$" or "$0.3 \leq (w1/w2) \leq 0.7$" may be satisfied.

The length of the narrowing portion in the axial direction of the groove may be, for example, 0.1 mm to 10 mm or 0.1 mm to 5 mm.

The groove 25 can have any cross-sectional shape. The cross-sectional shape of the groove 25 may be, for example, rectangular, U-shaped, or V-shaped.

The outlet opening portion 22 has a third cross-sectional area S3. The cross-sectional shape of the outlet opening portion 22 may be the same as or different from the cross-sectional shape of the inlet opening portion 21. The outlet opening portion 22 may or may not include a narrowing portion. For example, the relationship "S1<S2<S3" may be satisfied.

Planar Pattern

The groove 25 may have any planar pattern as long as the groove 25 includes the inlet region 25a, the intermediate region 25b, and the outlet region 25c. The groove 25 may, for example, meander, (see FIG. 1). The groove 25 may have, for example, a serpentine planar pattern. The groove 25 may extend, for example, in the form of a curve.

Figure 8:
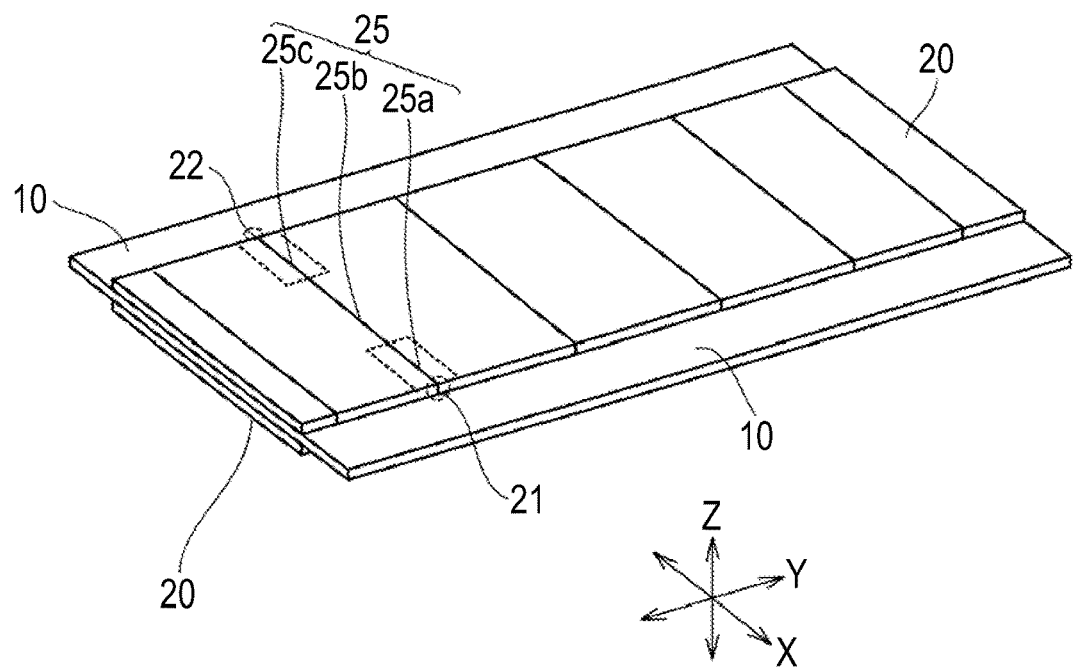
FIG. 8 is a schematic view showing an example of a planar pattern of groove.

FIG. 8 is a schematic view showing an example of the planar pattern of the groove. The groove 25 may linearly extend, for example. The groove 25 may extend across the surface of the active material layer 20, for example. A plurality of grooves 25 may be formed in a hairline pattern. The hairline represents a set of parallel lines. A plurality of grooves 25 may be formed in a lattice pattern.

Composition

The active material layer 20 contains an active material. The active material layer 20 may further contain, for example, a binder and a conductive material, in addition to the active material. The active material layer 20 may be formed, for example, by coating the surface of the base material 10 with a slurry in the form of a layer. The active material layer 20 may be formed, for example, by forming a wet powder into a sheet.

The active material may be, for example, in the form of particles. D50 of the active material may be, for example, 1 μm to 30 μm. The active material may include, for example, a positive electrode active material. Compared to a negative electrode active material, the positive electrode active material can store and release lithium ions at a higher potential. The positive electrode active material may include any component. The positive electrode active material may include, for example, at least one material selected from the group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. For example, "(NiCoMn)" in "$Li(NiCoMn)O_2$" shows that the total composition ratio of the material in the parentheses is 1. As long as the total composition ratio is 1, the amount of each component can be arbitrarily set. $Li(NiCoMn)O_2$ may include, for example, $Li(Ni_{1/3}Co_{1/3}Mn_{1/3})O_2$, $Li(Ni_{0.5}Co_{0.2}Mn_{0.3})O_2$, and $Li(Ni_{0.8}Co_{0.1}Mn_{0.1})O_2$.

The active material may include, for example, a negative electrode active material. Compared to the positive electrode active material, the negative electrode active material can store and release lithium ions at a lower potential. The negative electrode active material can include any component. The negative electrode active material may include at least one material selected from the group consisting of, for example, graphite, soft carbon, hard carbon, silicon, silicon oxide, a silicon-based alloy, tin, tin oxide, a tin-based alloy, and $Li_4Ti_5O_{12}$.

The conductive material can form an electron conduction path. The mixing amount of the conductive material may be, for example, 0.1 parts by mass to 10 parts by mass with respect to 100 parts by mass of the active material. The conductive material can include any component. The conductive material may include, for example, at least one material selected from the group consisting of carbon black, vapor grown carbon fibers, carbon nanotubes, and graphene flakes.

The binder can bind solid materials together. The mixing amount of the binder may be, for example, 0.1 parts by mass to 10 parts by mass with respect to 100 parts by mass of the active material. The binder can include any component. The binder may include, for example, at least one component selected from the group consisting of polyvinylidene fluoride (PVDF), polytetrafluoroethylene (PTFE), a vinylidene fluoride-hexafluoropropylene copolymer (PVDF-HFP), styrene butadiene rubber (SBR), carboxymethyl cellulose (CMC), polyimide (PI), polyamide-imide, (PAI), and polyacrylic acid (PAA).

Secondary Battery

Figure 9:
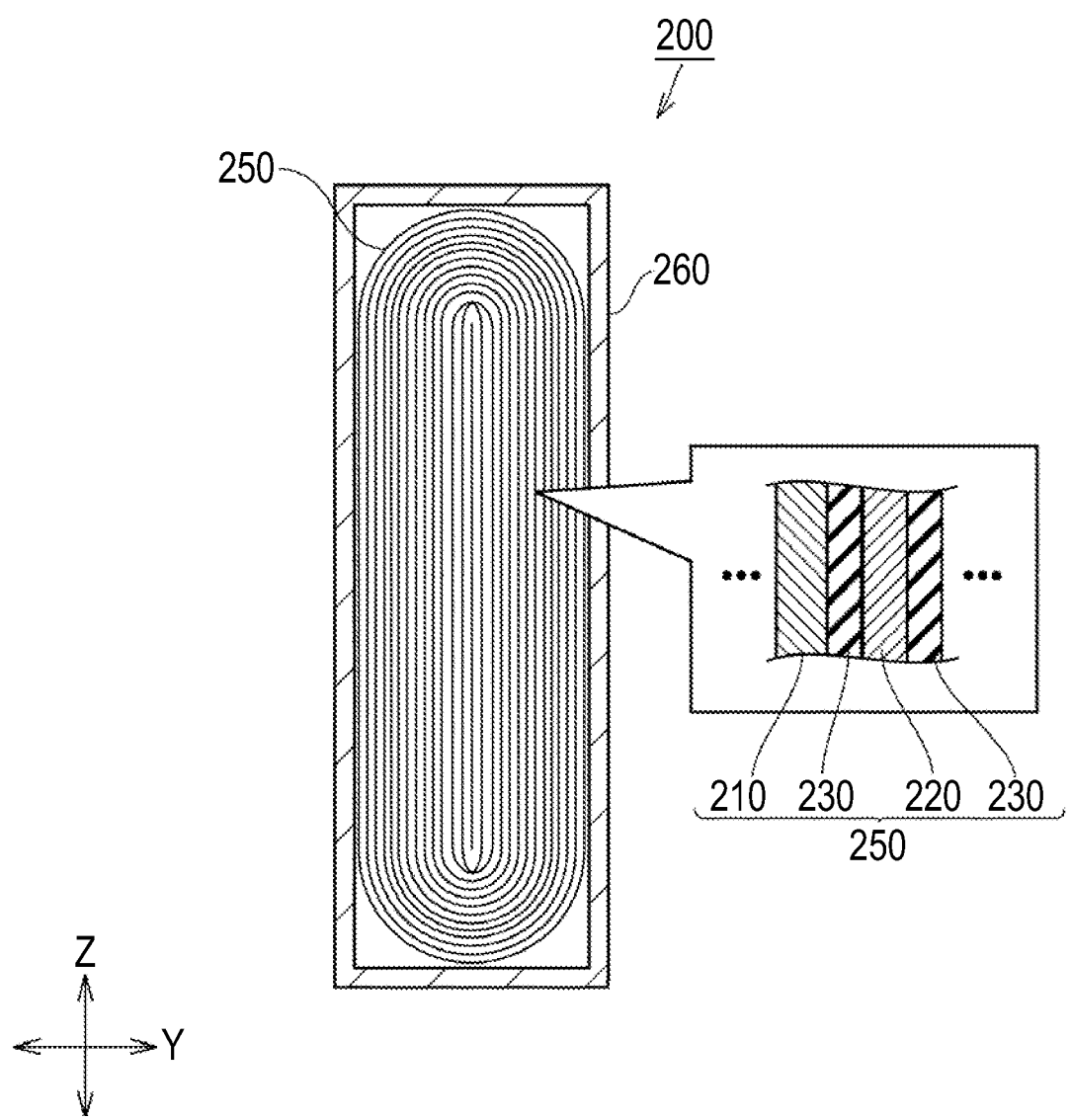
FIG. 9 is a schematic cross-sectional view showing a secondary battery in the present embodiment.

FIG. 9 is a schematic cross-sectional view showing a secondary battery in the present embodiment. Hereinafter, "secondary battery in the present embodiment" can be simply described as "the present battery".

The present battery 200 includes a case 260. The case 260 may be hermetically sealed. The case 260 can have any shape. The case 260 may be, for example, a pouch made of a metal foil laminated film. The case 260 may be, for example, a metal container or the like. The case 260 may be, for example, angular or cylindrical. The case 260 may contain, for example, Al.

The case 260 includes an electrode assembly 250 and an electrolytic solution (not shown in the drawing). The electrode assembly 250 is permeated with the electrolytic solution. Apart of the electrolytic solution may be stored in the bottom portion of the case 260. The electrode assembly 250 may have any shape. In FIG. 9, a roll-type electrode assembly 250 is shown as an example. The electrode assembly 250 may be, for example, a laminate type. The electrode assembly 250 includes a positive electrode 210 and a negative electrode 220. The electrode assembly 250 may further include a separator 230. At least one of the positive electrode 210 and the negative electrode 220 is the present electrode 100 described above. That is, the present battery 200 includes the present electrode 100 and an electrolytic solution.

The separator 230 can be interposed between the positive electrode 210 and the negative electrode 220. The separator 230 is an electrically insulating material. The separator 230 is porous. The separator 230 may be made of, for example, polyolefin.

Electrolytic Solution

The electrolytic solution is a liquid electrolyte. The electrolytic solution can be a viscous fluid. The electrolytic solution may have a density of, for example, 500 kg/cm³ to 2,000 kg/cm³. The electrolytic solution contains a lithium salt and a solvent. The electrolytic solution may further contain any additive.

The lithium salt is dissolved in the solvent. The lithium salt may include, for example, at least one salt selected from the group consisting of $LiPF_6$, $LiBF_4$, and $Li(FSO_2)_2N$. The concentration of the lithium salt may be, for example, 0.5 mol/L to 2 mol/L.

The solvent may include any component. The solvent may include, for example, at least one compound selected from the group consisting of ethylene carbonate (EC), propylene carbonate (PC), butylene carbonate (BC), ethylmethyl carbonate (EMC), dimethyl carbonate (DMC), and diethyl carbonate (DEC). The additive may include, for example, at least one compound selected from the group consisting of vinylene carbonate (VC), vinylethylene carbonate (VEC), 1,3-propanesultone (PS), cyclohexylbenzene (CHB), tert-amylbenzene (TAB), and lithium bis(oxalate) borate (Li-BOB).

The present embodiment is an example in all respects. The present embodiment is not restrictive. The technical scope of the present disclosure includes all modifications within the meaning and scope equivalent to the description of CLAIMS. For example, extracting arbitrary configurations from the present embodiment and arbitrarily combining the configurations are preconceived from the first.

What is claimed is:

1. An electrode comprising:
a base material; and
an active material layer, wherein
the active material layer is disposed on a surface of the base material,
the active material layer has one or more grooves on a surface of the active material layer,
the one or more grooves linearly extend along the surface of the active material layer,
each of the one or more grooves comprises a plurality of cross-sectional area changing portions extending from a side wall of the one or more grooves,
in a plan view, each of the one or more grooves comprising a first region, a second region, and a third region,
the first region comprises a first opening portion at a periphery of the active material layer,
the third region comprises a second opening portion at the periphery of the active material layer,
the second region is disposed between the first region and the third region,
the second region connects the first region with the third region,
each of the first region and the third region is configured such that a first pressure loss occurring when a fluid flows in a forward direction is smaller than a second pressure loss occurring when the fluid flows in a backward direction,
the forward direction represents a direction from the first region to the third region,
the backward direction represents a direction from the third region to the first region,
a cross-section of the one or more grooves gradually decreases in the forward direction due to the plurality of cross-sectional area changing portions.

2. The electrode according to claim 1, wherein at least one of the first region and the third region is configured such that streams of the fluid converge when the fluid flows in the forward direction and diverge when the fluid flows in the backward direction.

3. The electrode according to claim 1, wherein the plurality of cross-sectional area changing portions are arranged in a row in the forward direction.

4. The electrode according to claim 1, wherein in each cross-sectional area changing portion of the plurality of cross-sectional area changing portions, the fluid converges when flowing in the forward direction and diverges when flowing in the backward direction.

5. A secondary battery comprising:
an electrode having a base material and an active material layer; and
an electrolytic solution, wherein
the active material layer is disposed on a surface of the base material,
the active material layer has one or more grooves on a surface of the active material layer,
the one or more grooves linearly extend along the surface of the active material layer,
each of the one or more grooves comprises a plurality of cross-sectional area changing portions arranged along the groove and extending from a side wall of the groove,
in a plan view, each of the one or more grooves includes a first region, a second region, and a third region,
the first region includes a first opening portion at a periphery of the active material layer,
the third region includes a second opening portion at the periphery of the active material layer,
the second region is disposed between the first region and the third region,
the second region connects the first region with the third region,
each of the first region and the third region is configured such that a first pressure loss occurring when a fluid flows in a forward direction is smaller than a second pressure loss occurring when the fluid flows in a backward direction,
the forward direction represents a direction from the first region to the third region, and
the backward direction represents a direction from the third region to the first region,
a cross-section of each of the one or more grooves gradually decreases in the forward direction due to the plurality of cross-sectional area changing portions.

6. An electrode comprising:
a base material; and
an active material layer, wherein
the active material layer is disposed on a surface of the base material,
the active material layer has one or more grooves on a surface of the active material layer,
the one or more grooves linearly extend along the surface of the active material layer,
in a plan view, each of the one or more grooves comprising a first region, a second region, and a third region,
the first region comprises a first opening portion at a periphery of the active material layer,
the third region comprises a second opening portion at the periphery of the active material layer,
the second region is disposed between the first region and the third region,
the second region connects the first region with the third region,
each of the first region and the third region is configured such that a first pressure loss occurring when a fluid flows in a forward direction is smaller than a second pressure loss occurring when the fluid flows in a backward direction,
the forward direction represents a direction from the first region to the third region,
the backward direction represents a direction from the third region to the first region,
at least one of the first region and the third region comprises a main flow channel and a plurality of loop flow channels,
each loop flow channel of the plurality of loop flow channels diverges from the main flow channel at a first end and converges with the main flow channel at a second end.

7. The electrode according to claim 6, wherein at least one of the first region and the third region is configured such that streams of the fluid converge when the fluid flows in the forward direction and diverge when the fluid flows in the backward direction.

\* \* \* \* \*